United States Patent
Iyanagi et al.

(10) Patent No.: US 10,220,582 B2
(45) Date of Patent: Mar. 5, 2019

(54) CARCASS BAND FORMING DEVICE AND CARCASS BAND FORMING METHOD

(71) Applicant: BRIDGESTONE CORPORATION, Tokyo (JP)

(72) Inventors: Satoshi Iyanagi, Kodaira (JP); Masato Iwasaki, Tokorozawa (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 433 days.

(21) Appl. No.: 14/893,177

(22) PCT Filed: Mar. 27, 2014

(86) PCT No.: PCT/JP2014/059033
§ 371 (c)(1),
(2) Date: Nov. 23, 2015

(87) PCT Pub. No.: WO2014/196246
PCT Pub. Date: Dec. 11, 2014

(65) Prior Publication Data
US 2016/0121568 A1 May 5, 2016

(30) Foreign Application Priority Data

Jun. 5, 2013 (JP) .................. 2013-118692

(51) Int. Cl.
B29D 30/20 (2006.01)
B29D 30/00 (2006.01)
B29D 30/24 (2006.01)
B29D 30/26 (2006.01)

(52) U.S. Cl.
CPC ........... *B29D 30/005* (2013.01); *B29D 30/20* (2013.01); *B29D 30/244* (2013.01);
(Continued)

(58) Field of Classification Search
CPC .. B29D 30/005; B29D 30/2607; B29D 30/20; B29D 30/244; B29D 30/246;
(Continued)

(56) References Cited

U.S. PATENT DOCUMENTS

| 5,156,713 A | 10/1992 | Ishii et al. |
| 5,582,666 A | 12/1996 | Irie |

(Continued)

FOREIGN PATENT DOCUMENTS

| DE | 19918523 C1 | 4/2000 |
| EP | 1650012 A1 | 4/2006 |

(Continued)

OTHER PUBLICATIONS

Khaksar-Haghani et al., "A genetic algorithm for solving a multi-floor layout design model of a cellular manufacturing system with alternative process routings and flexible configuration," Int J Adv Manuf Technol (2013) 66:845-865, Published online Sep. 2, 2012.*

(Continued)

*Primary Examiner* — Geoffrey L Knable
(74) *Attorney, Agent, or Firm* — Sughrue Mion, PLLC

(57) ABSTRACT

A space required for forming a cylindrical carcass band is reduced and productivity of carcass band forming is improved.
A first forming drum (21) forms a cylindrical carcass ply (3). A second forming drum (22) forms a cylindrical member (7) by forming a cylindrical inner liner (4) and combining the inner liner (4) with the carcass ply (3). A third forming drum (23) forms a cylindrical side member (5) a carcass band (8) by forming a cylindrical side member (5) and combining the side member (5) with the cylindrical member (7). A conveying device (30) conveys the carcass ply (3) from the first forming drum (21) to the second forming drum (22) and conveys the cylindrical member (7) from the second forming drum (22) to the third forming drum (23). The third forming (Continued)

drum (23) is arranged below an arrangement space for the first forming drum (21) and the second forming drum (22).

3 Claims, 2 Drawing Sheets

(52) U.S. Cl.
CPC ......... *B29D 30/246* (2013.01); *B29D 30/247* (2013.01); *B29D 30/2607* (2013.01); *B29D 2030/202* (2013.01)

(58) Field of Classification Search
CPC ............ B29D 30/247; B29D 2030/202; B29D 2030/203; B29D 2030/204; B29D 2030/205; B29D 2030/206; B29D 2030/2692
See application file for complete search history.

(56) References Cited

U.S. PATENT DOCUMENTS

| | | | | |
|---|---|---|---|---|
| 5,853,525 A | * | 12/1998 | Irie | ..................... B29D 30/005 156/396 |
| 6,139,668 A | * | 10/2000 | Stokes | ................. B29D 30/005 156/111 |
| 2010/0212812 A1 | | 8/2010 | Ogawa | |
| 2013/0098537 A1 | | 4/2013 | Maruoka et al. | |

FOREIGN PATENT DOCUMENTS

| | | | | |
|---|---|---|---|---|
| JP | 63-218338 | A | | 9/1988 |
| JP | 01-285337 | A | | 11/1989 |
| JP | 07-276528 | A | | 10/1995 |
| JP | 2001-138404 | A | | 5/2001 |
| JP | 2003-236946 | A | | 8/2003 |
| JP | 2012-240340 | A | * | 12/2012 |
| SU | 682389 | A | * | 8/1979 |
| WO | 2009/031374 | A1 | | 3/2009 |
| WO | 2012/005029 | A1 | | 1/2012 |

OTHER PUBLICATIONS

Djassemi, M., "Improving Factory Layout under a Mixed Floor and Overhead Material Handling Condition," Journal of Manufacturing Technology Management • Mar. 2007.*

Communication dated Apr. 28, 2016 from the European Patent Office issued in corresponding Application No. 14807954.4.

International Search Report for PCT/JP2014/059033 dated Jun. 24, 2014.

* cited by examiner

CARCASS BAND FORMING DEVICE AND CARCASS BAND FORMING METHOD

CROSS REFERENCE TO RELATED APPLICATIONS

This application is a National Stage of International Application No. PCT/JP2014/059033 filed Mar. 27, 2014, claiming priority based on Japanese Patent Application No. 2013-118692 filed Jun. 5, 2013, the contents of all of which are incorporated herein by reference in their entirety.

TECHNICAL FIELD

The present invention relates to a carcass band forming device and a carcass band forming method for forming a cylindrical carcass band by a forming drum.

BACKGROUND ART

In forming of a tire, a carcass ply, an inner liner, and a side member are combined by a forming drum, and a carcass band which is an intermediate forming body of a tire is formed in general. Subsequently, the carcass band is combined with a belt and a tread, and a tire constituted by a plurality of tire constituent members is formed. Regarding this carcass band forming device, a tire production system in which a carcass band is formed by turning a pair of band forming drums by a drum turning/driving device has been known (see Patent Literature 1).

In the tire production system described in Patent Literature 1, the tire constituent members are supplied to the band forming drums at the respective positions while the positions of the pair of the band forming drums are switched by turning, and a cylindrical tire constituent member is formed, respectively by the pair of the band forming drums. Moreover, the carcass ply is formed by the carcass ply forming drum and the cylindrical carcass ply is conveyed to the band forming drum by a conveying device. As a result, a cylindrical carcass band is formed by combining a plurality of types of tire constituent members. However, in this prior-art tire production system, a turning region of the band forming drum becomes large, and a large area is occupied for turning of the pair of band forming drums. The turning region of the band forming drum, the conveying device, and the carcass ply forming drum are arranged side by side in a horizontal direction. Thus, a space required for forming the carcass band (installation space for the carcass band forming device) becomes large.

In addition, in the prior-art tire production system, the tire constituent member cannot be formed by the band forming drum during turning of the band forming drum. Moreover, the supply device of the tire constituent member needs to be moved outside the turning region of the band forming drum before turning of the band forming drum. After turning of the band forming drum, the supply device of the tire constituent member needs to be moved within the turning region of the band forming drum and arranged at a supply position of the tire constituent member. While the supply device is being moved, the tire constituent member cannot be supplied, and forming of the tire constituent member is stopped. If time is wasted for turning of the band forming drum and movement of the supply device as above, forming time of the carcass band is prolonged. As a result, there is a concern that productivity of the carcass band forming lowers.

CITATION LIST

Patent Literature

PTL 1: Japanese Patent Laid-Open No. 2003-236946

SUMMARY OF INVENTION

Technical Problem

The present invention was made in view of the aforementioned prior-art problems and has an object to reduce the space required for forming the cylindrical carcass band and to improve productivity of carcass band forming.

Solution to Problem

The present invention is a carcass band forming device for forming a cylindrical carcass band by combining a carcass ply, an inner liner, and side members, including a first forming drum for forming a cylindrical carcass ply, a second forming drum for forming a cylindrical member by forming a cylindrical inner liner and combining the cylindrical inner liner with the cylindrical carcass ply, a third forming drum for forming a carcass band by forming a cylindrical side member and combining a cylindrical side member with the cylindrical member and a conveying device for conveying the cylindrical carcass ply from the first forming drum to the second forming drum and for conveying the cylindrical member from the second forming drum to the third forming drum, wherein the third forming drum is arranged below an arrangement space for the first forming drum and the second forming drum.

Moreover, the present invention is a carcass band forming method for forming a cylindrical carcass band by combining a carcass ply, an inner liner, and side members, including the steps of forming a cylindrical carcass ply by a first forming drum, forming a cylindrical inner liner by a second forming drum, forming a cylindrical side member by a third forming drum arranged below an arrangement space for the first forming drum and the second forming drum, conveying the cylindrical carcass ply from the first forming drum to the second forming drum, forming a cylindrical member by combining the cylindrical inner liner with the cylindrical carcass ply by the second forming drum; conveying the cylindrical member from the second forming drum to the third forming drum, and forming a carcass band by combining the cylindrical side member with the cylindrical member by the third forming drum.

Advantageous Effects of Invention

According to the present invention, the space required for forming the cylindrical carcass band can be reduced, and productivity of the carcass band forming can be improved.

DESCRIPTION OF EMBODIMENTS

An embodiment of a carcass band forming device and a carcass band forming method of the present invention will be described by referring to the attached drawings.

In the carcass band forming device and the carcass band forming method of this embodiment, a plurality of forming drums is used so as to form a carcass band by a plurality of types of tire constituent members. At that time, a carcass ply, an inner liner, and side members are combined so as to form a cylindrical carcass band. The carcass band is a cylindrical body having the cylindrical carcass ply and constitutes an intermediate forming body of a tire. Moreover, the side member is a tire constituent member (side rubber, here) arranged in a side portion of a tire. A pair of the side members are combined with the carcass band in correspondence with the pair of side portions.

Figure 1:
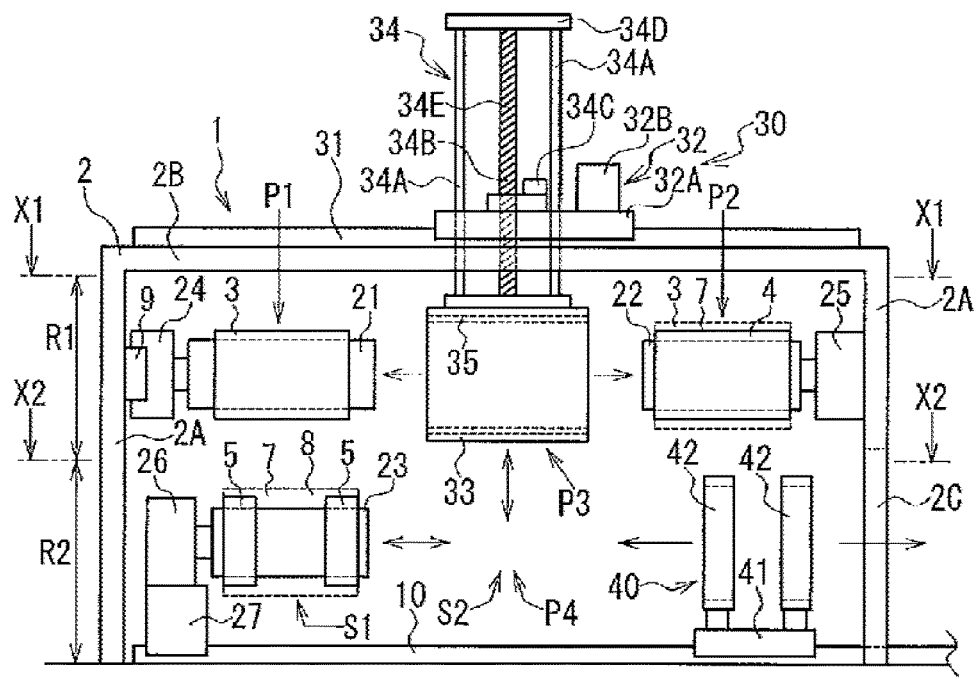
FIG. 1 is a front view illustrating a carcass band forming device of this embodiment.
Figure 2:
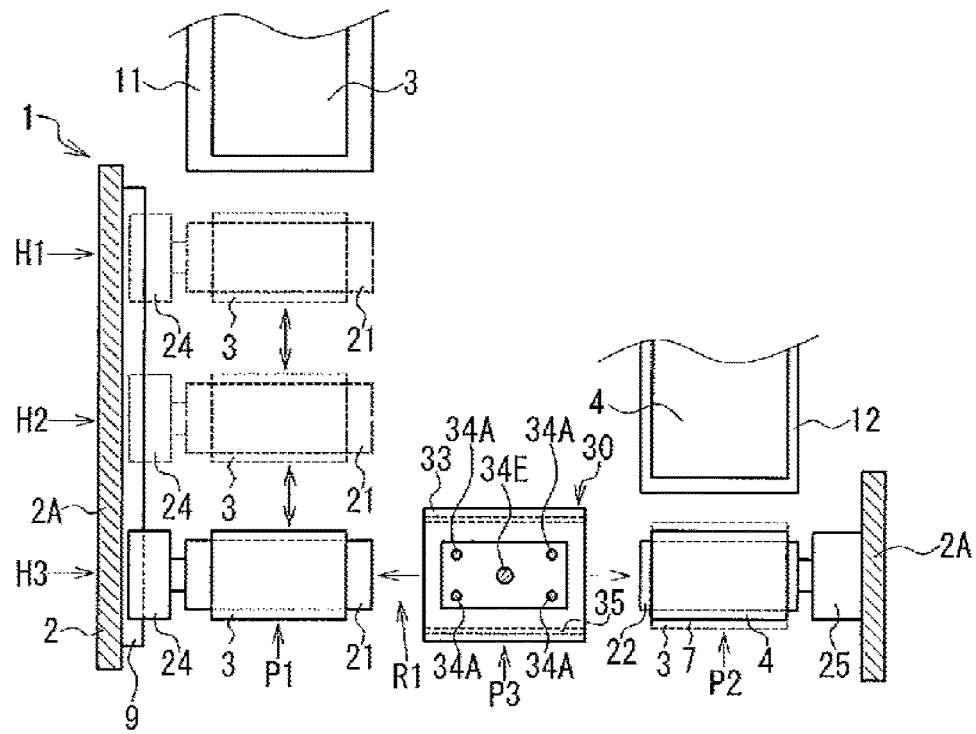
FIG. 2 is a plan view of the carcass band forming device when an X1-X1 line in FIG. 1 is viewed in an arrow direction.
Figure 3:
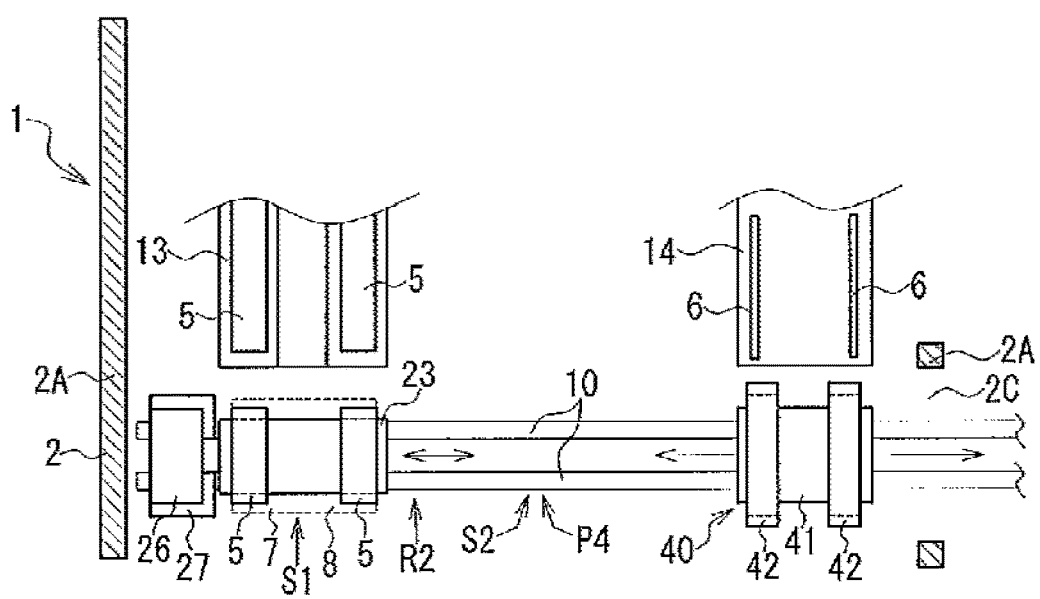
FIG. 3 is a plan view of the carcass band forming device when an X2-X2 line in FIG. 1 is viewed in an arrow direction.

FIG. 1 is a front view illustrating a carcass band forming device (hereinafter referred to as a forming device) 1 of this embodiment and schematically illustrates an outline constitution of the forming device 1. FIG. 2 is a plan view of the forming device 1 when an X1-X1 line in FIG. 1 is viewed in an arrow direction, and FIG. 3 is a plan view of the forming device 1 when an X2-X2 line in FIG. 1 is viewed in an arrow direction. FIG. 2 illustrates the forming device 1 by omitting a portion illustrated in FIG. 3. Actually, a portion of the forming device 1 illustrated in FIG. 2 is arranged above the portion of the forming device 1 illustrated in FIG. 3.

As illustrated, the forming device 1 includes a frame 2, a plurality of supply devices (first to fourth supply devices) 11 to 14 (not shown in FIG. 1), a plurality of forming drums (first to third forming drums) 21 to 23 arranged in the frame 2, a first conveying device 30 mounted on the frame 2, a second conveying device 40, and a controller (not shown) for controlling the entire forming device 1.

The first to fourth supply devices 11 to 14 are supply devices of first to fourth tire constituent members 3 to 6, respectively, and have moving means (conveyers, here) for moving the first to fourth tire constituent members 3 to 6. The first to third supply devices 11 to 13 are installed toward the first to third forming drums 21 to 23, respectively. The first forming drum 21 is moved to a position (winding position H1) adjacent to a front end portion of the first supply device 11, a position (removal position H3) away from the first supply device 11, and a position (joint position H2) between the two positions H1 and H3. The second and third forming drums 22 and 23 are arranged at positions adjacent to front end portions of the second and third supply devices 12 and 13, respectively. The fourth supply device 14 is installed toward the second conveying device 40, and the second conveying device 40 is arranged at a position adjacent to a front end portion of the fourth supply device 14. The first supply device 11 is located above the third supply device 13, and the second supply device 12 is located above the fourth supply device 14.

In a state in which the first forming drum 21 is arranged at the winding position H1, the first supply device 11 moves the first tire constituent member (carcass ply 3) toward the first forming drum 21 and supplies the band-shaped carcass ply 3 to the first forming drum 21. The carcass ply 3 in a predetermined length is moved in a longitudinal direction by the first supply device 11 and is wound around an outer periphery of the first forming drum 21. The second supply device 12 moves the second tire constituent member (inner liner 4) toward the second forming drum 22 and supplies the band-shaped inner liner 4 to the second forming drum 22. The inner liner 4 in a predetermined length is moved in the longitudinal direction by the second supply device 12 and is wound around an outer periphery of the second forming drum 22.

The third supply device 13 moves the third tire constituent member (side member 5) toward the third forming drum 23 and supplies the band-shaped side member 5 to the third forming drum 23. The side member 5 in a predetermined length is moved in the longitudinal direction by the third supply device 13 and is wound around an outer periphery of the third forming drum 23. At that time, the pair of side members 5 are supplied to the third forming drum 23 at the same time and are wound at positions apart from each other on the third forming drum 23.

The fourth supply device 14 moves the fourth tire constituent member (bead member 6) toward the second conveying device 40 and supplies the annular bead member 6 to the second conveying device 40. The bead member 6 is a member made only of a bead core or a member formed by combining a bead core and another tire constituent member (a bead filler, for example). That is, the bead member 6 is a member having at least a bead core and is formed annularly in advance. By means of a set device (not shown), a pair of the bead members 6 are moved from the fourth supply device 14 to the second conveying device 40 and are set on the second conveying device 40.

The first to third forming drums 21 to 23 are made of rotatable cylindrical drums, respectively, and are connected to driving devices 24 to 26 and supported in a horizontal state by the driving devices 24 to 26. Moreover, the first to third forming drums 21 to 23 rotate at a predetermined speed by rotational driving of the driving devices 24 to 26 and stop in a state having been rotated only by a predetermined rotational angle. Outer peripheries of the first to third forming drums 21 to 23 are expandable by expanding means (not shown). The driving device 24 of the first forming drum 21 has a moving device (not shown) connected to a guide rail 9 and is moved along the guide rail 9 by the moving device. This moving device is driven by a motor (a servo motor, here) of a driving portion and moves the driving device 24 and the first forming drum 21. The guide rail 9 is arranged at a right angle to an axis of the first forming drum 21. By means of the moving device of the driving device 24, the first forming drum 21 moves between the winding position H1 and the removal position H3 and is arranged at the respective positions H1, H2, and H3.

In a state in which the first forming drum 21 is arranged at the winding position H1, the carcass ply 3 is wound one turn around the rotating first forming drum 21 and is formed cylindrically by the first forming drum 21. Subsequently, the first forming drum 21 moves from the winding position H1 to the joint position H2 and is arranged at the joint position H2. In that state, a front end portion and a rear end portion of the carcass ply 3 are joined on an outer periphery of the first forming drum 21 by a joining device (not shown), and the cylindrical carcass ply 3 is held on the first forming drum 21. Subsequently, the first forming drum 21 moves to the removal position H3 from the joint position H2 and is arranged at the removal position H3. In that state, the cylindrical carcass ply 3 is removed from the first forming drum 21 by the first conveying device 30 and is delivered to the first conveying device 30.

The inner liner 4 is wound one turn around the rotating second forming drum 22 and is formed cylindrically by the second forming drum 22. A front end portion and a rear end portion of the inner liner 4 are joined on an outer periphery of the second forming drum 22 by a joining device (not shown), and the cylindrical inner liner 4 is held on the second forming drum 22. Moreover, the cylindrical carcass ply 3 is conveyed by the first conveying device 30 from the first forming drum 21 to the second forming drum 22 and is arranged around the cylindrical inner liner 4. The second forming drum 22 forms a cylindrical member 7 made of the carcass ply 3 and the inner liner 4 by combining the cylindrical inner liner 4 with the cylindrical carcass ply 3.

The pair of side members 5 are wound one turn around the rotating third forming drum 23 and is formed cylindrically by the third forming drum 23. A front end portion and a rear end portion of each of the pair of side members 5 is joined on an outer periphery of the third forming drum 23 by a joining device (not shown), and the pair of cylindrical side members 5 are held on the third forming drum 23. Moreover, the cylindrical member 7 is conveyed by the first conveying device 30 from the second forming drum 22 to the third forming drum 23 and is arranged around the pair of cylindrical side members 5. The third forming drum 23 forms the cylindrical carcass band 8 made of the cylindrical member 7 and the pair of side members 5 by combining the pair of cylindrical side members 5 with the cylindrical member 7.

In this embodiment, a space (arrangement space) for arranging the first to third forming drums 21 to 23 is made of a first arrangement space R1 (upper space) which is an upper part of the forming device 1 and a second arrangement space R2 (lower space) which is a lower part of the forming device 1. The first arrangement space R1 and the second arrangement space R2 are provided in the frame 2 by vertically dividing the space in the frame 2. The first to third forming drums 21 to 23 are divided into the two arrangement spaces and arranged in the first arrangement space R1 or the second arrangement space R2. Specifically, the first forming drum 21 and the second forming drum 22 are arranged in the first arrangement space R1 above the second arrangement space R2, and the third forming drum 23 is arranged in the second arrangement space R2 below the first arrangement space R1.

In the first arrangement space R1, the guide rail 9 is mounted on a side portion 2A of the frame 2, and the driving device 24 of the first forming drum 21 is connected to the guide rail 9. Moreover, the driving device 25 of the second forming drum 22 is mounted on the side portion 2A of the frame 2 in the first arrangement space R1. The first forming drum 21 and the second forming drum 22 are arranged above the arrangement space (second arrangement space R2) of the third forming drum 23 and is located on an upper side from the third forming drum 23. When the first forming drum 21 is arranged at the removal position H3, the first forming drum 21 and the second forming drum 22 are arranged at a predetermined interval with their axes being aligned. As described above, in the first arrangement space R1, the first forming drum 21 and the second forming drum 22 can be arranged so that their axes are located on a same line.

The third forming drum 23 is arranged below the arrangement space (first arrangement space R1) of the first forming drum 21 and the second forming drum 22 and is located below the first forming drum 21 and the second forming drum 22. In a state in which the first forming drum 21 is arranged at the removal position H3, an axis of the third forming drum 23 is in parallel with the axes of the first and second forming drums 21 and 22, and the axes of the first to third forming drums 21 to 23 are located on the same plane. Here, the axes of the first to third forming drums 21 to 23 are arranged in a horizontal direction and are located on the same perpendicular plane. Moreover, the third forming drum 23 is arranged below the first forming drum 21, and the first forming drum 21 and the third forming drum 23 are arranged side by side vertically.

The first conveying device 30 is mounted on an upper portion 2B of the frame 2 and holds and conveys the cylindrical carcass ply 3 and the cylindrical member 7 in the first and second arrangement spaces R1 and R2. Moreover, the first conveying device 30 has a guide rail 31 fixed to the frame 2, a first moving mechanism 32 connected to the guide rail 31, a holding portion 33 for holding the cylindrical carcass ply 3 and the cylindrical member 7, and a second moving mechanism 34 connected to the holding portion 33. The guide rail 31 is arranged in parallel with the axes of the first and second forming drums 21 and 22. The first moving mechanism 32 has a moving portion 32A moving along the guide rail 31 and a driving portion 32B for moving the moving portion 32A. The moving portion 32A is driven by a motor (a servomotor, here) of the driving portion 32B and moves on the guide rail 31. As a result, the first moving mechanism 32 moves in an axial direction (horizontal direction, here) of the first and second forming drums 21 and 22.

The second moving mechanism 34 is mounted on the moving portion 32A of the first moving mechanism 32 and is moved integrally with the moving portion 32A. Moreover, the second moving mechanism 34 has a ball spline 34A supporting the holding portion 33, a ball screw 34B moving the holding portion 33, a driving portion 34C for driving the ball screw 34B, and a connecting member 34D. A screw shaft 34E of the ball screw 34B and the ball spline 34A extend through the moving portion 32A and also extend through a through-portions (not shown) of the guide rail 31 and the frame 2 formed along the guide rail 31. An upper end of the ball spline 34A and an upper end of the screw shaft 34E are connected by the connecting member 34D, while a lower end of the ball spline 34A and a lower end of the screw shaft 34E are mounted on the holding portion 33. As a result, the ball spline 34A, the screw shaft 34E, the connecting member 34D, and the holding portion 33 move integrally. A nut (not shown) of the ball screw 34B is rotatably connected to the moving portion 32A, and the driving portion 34C rotates the nut (not shown) of the ball screw 34B by a motor (a servo motor, here). This rotation of the nut moves the screw shaft 34E in the vertical direction with respect to the nut and the moving portion 32A. With movement of the screw shaft 34E, the ball spline 34A, the connecting member 34D, and the holding portion 33 move in the vertical direction.

The second moving mechanism 34 moves the holding portion 33 in the vertical direction in a region between the first forming drum 21 and the second forming drum 22 and moves it to the first arrangement space R1 and the second arrangement space R2. Moreover, the first moving mechanism 32 moves the second moving mechanism 34, and moves the holding portion 33 in the axial direction of the first and second forming drums 21 and 22. The first conveying device 30 moves the holding portion 33 by the first moving mechanism 32 and the second moving mechanism 34 and conveys the cylindrical carcass ply 3 and the cylindrical member 7 held by the holding portion 33.

The holding portion 33 has a cylindrical shape and is formed in a shape and a dimension capable of accommodating the first to third forming drums 21 to 23. The first to third forming drums 21 to 23 are accommodated in the holding portion 33 and arranged inside (internal space) of the holding portion 33. In that state, the holding portion 33 holds the cylindrical carcass ply 3 and the cylindrical member 7 by holding means 35 provided on an inner periphery while maintaining the cylindrical shape. For example, the holding means 35 has suctioning means for suctioning and holding the cylindrical carcass ply 3 and the cylindrical member 7 and suctions outer peripheral surfaces of the cylindrical carcass ply 3 and the cylindrical member 7 by a plurality of suction pads of the suctioning means. The cylindrical carcass ply 3 and the cylindrical member 7 are held in the cylindrical shape by the first conveying device 30 and are conveyed while maintaining the cylindrical shape. By stopping the holding by the holding means 35 (suctioning by the suctioning means), the cylindrical carcass ply 3 and the cylindrical member 7 are released from the holding portion 33.

In a state in which the centerline of the holding portion 33 and the axes of the first to third forming drums 21 to 23 are located on the same plane, the holding portion 33 is moved in the first and second arrangement spaces R1 and R2 by the first conveying device 30 and are arranged at the predetermined position. Moreover, the center line of the holding portion 33 is arranged on the same line with the axes of the first and second forming drums 21 and 22 by the second moving mechanism 34 of the first conveying device 30. In that state, the holding portion 33 moves along the axes of the first and second forming drums 21 and 22 in the first arrangement space R1, by the first moving mechanism 32 of the first conveying device 30. As a result, the holding portion 33 moves to a first position P1 where the first forming drum 21 is accommodated, a second position P2 where the second forming drum 22 is accommodated, and a third position P3 (intermediate position) between the first forming drum 21 and the second forming drum 22. In the region between the first forming drum 21 and the second forming drum 22, the second moving mechanism 34 moves the holding portion 33 to the third position P3 and a fourth position P4 adjacent to the third forming drum 23. This fourth position P4 is a delivery position of the cylindrical member 7 to the third forming drum 23, and the center line of the holding portion 33 is arranged on the same line with the axis of the third forming drum 23 at the fourth position P4.

The third forming drum 23 has a moving device 27 connected to a guide rail 10. The driving device 26 of the third forming drum 23 is mounted on the moving device 27, and the driving device 26 and the third forming drum 23 are moved by the moving device 27. The guide rail 10 is arranged in parallel with the axis of the third forming drum 23 and is installed from the second arrangement space R2 to the outside of the frame 2 through an opening portion 2C of the frame 2. The moving device 27 is driven by a motor (a servo motor, here) (not shown) of the driving portion and is moved along the guide rail 10. The moving device 27 moves the third forming drum 23 in the axial direction of the third forming drum 23 in the second arrangement space R2. At that time, the third forming drum 23 moves in the center line direction of the holding portion 33 arranged at a fourth position P4. Moreover, in a state in which the cylindrical member 7 (holding portion 33) is arranged at the delivery position (fourth position P4), the third forming drum 23 is arranged by the moving device 27 at a position outside the cylindrical member 7 (outside position S1) and a position inside the cylindrical member 7 (inside position S2).

The moving device 27 moves the third forming drum 23 to the outside position S1 and the inside position S2 of the cylindrical member 7 at the delivery position. The outside position S1 of the third forming drum 23 is a reference position of the third forming drum 23. At the outside position S1, the third forming drum 23 is arranged below the first forming drum 21 and forms the pair of side members 5 supplied from the third supply device 13. The inside position S2 of the third forming drum 23 is a position where the cylindrical member 7 is delivered from the first conveying device 30 to the third forming drum 23. With movement to the inside position S2, the third forming drum 23 is inserted into the holding portion 33 and the cylindrical member 7 and arranged inside the cylindrical member 7. At the inside position S2, the third forming drum 23 receives the cylindrical member 7 and combines the cylindrical member 7 with the pair of cylindrical side members 5. As a result, the carcass band 8 composed of the carcass ply 3, the inner liner 4, and the side members 5 is formed. After that, the third forming drum 23 moves to the outside position S1 and the holding portion 33 moves to the third position P3. Subsequently, the pair of bead members 6 are conveyed by the second conveying device 40 to the third forming drum 23.

The second conveying device 40 has a moving mechanism 41 connected to the guide rail 10 and a pair of holding portions 42 mounted on the moving mechanism 41. The moving mechanism 41 is driven by a motor of the driving portion (a servo motor, here) (not shown) and is moved along the guide rail 10. The pair of annular holding portions 42 hold the bead member 6 and the carcass band 8 by holding means (not shown) and is moved in the axial direction of the third forming drum 23 by the moving mechanism 41. The second conveying device 40 holds the pair of bead members 6 supplied from the fourth supply device 14 and conveys the bead members 6 to the third forming drum 23. The pair of bead members 6 are arranged around the carcass band 8 and are combined with the carcass band 8 by the third forming drum 23. After that, the second conveying device 40 holds the bead members 6 and the carcass band 8 while maintaining the cylindrical shape of the carcass band 8 by the pair of holding portions 42.

Subsequently, a forming procedure of the cylindrical carcass band 8 will be described.

First, the cylindrical carcass ply 3 is formed by the first forming drum 21, and the cylindrical inner liner 4 is formed by the second forming drum 22. The pair of cylindrical side members 5 are formed by the third forming drum 23, and the pair of bead members 6 are held in the second conveying device 40. The forming device 1 performs forming of the carcass ply 3, the inner liner 4, and the pair of side members 5 at the same time. Subsequently, the first forming drum 21 is arranged at the removal position H3, and the first conveying device 30 moves the holding portion 33 to the position (first position P1) where the first forming drum 21 is accommodated. The first forming drum 21 and the cylindrical carcass ply 3 are arranged inside the holding portion 33. Then the cylindrical carcass ply 3 is held by the holding portion 33, thereafter the first forming drum 21 is contracted and the carcass ply 3 is removed from the first forming drum 21. The cylindrical carcass ply 3 is removed from the first forming drum 21 and held by the holding portion 33.

Subsequently, the first conveying device 30 moves the holding portion 33 and the cylindrical carcass ply 3 to the position (second position P2) where the second forming drum 22 is accommodated, and the cylindrical carcass ply 3 is conveyed from the first forming drum 21 to the second forming drum 22. The second forming drum 22 and the cylindrical inner liner 4 are arranged inside the holding portion 33 and the cylindrical carcass ply 3 by the first conveying device 30, and the cylindrical carcass ply 3 is arranged around the cylindrical inner liner 4. At that time, while locating axes of the first forming drum 21 and the second forming drum 22 on the same line, the first conveying device 30 conveys the cylindrical carcass ply 3 from the first forming drum 21 to the second forming drum 22. Moreover, the first conveying device 30 (holding portion 33) holds the cylindrical carcass ply 3 while maintaining the cylindrical shape and arranges it at a combination position with the cylindrical inner liner 4. Subsequently, by expanding the second forming drum. 22, the inner liner 4 is brought into close contact with the carcass ply 3, and the carcass ply 3 and the inner liner 4 are integrally formed. As described above, the second forming drum 22 combines the cylindrical carcass ply 3 with the cylindrical inner liner 4 so as to form the cylindrical member 7. In that state, the second forming drum 22 is contracted, and the cylindrical member 7 is removed from the second forming drum 22. The cylindrical member 7 is removed from the second forming drum. 22 and held by the holding portion 33.

In the state in which the cylindrical member 7 is held by the holding portion 33, the cylindrical member 7 is conveyed by the first conveying device 30 from the second forming drum 22 to the third forming drum 23. Specifically, the first conveying device 30 separates the holding portion 33 and the cylindrical member 7 from the second forming drum 22 and moves them to the third position P3. Moreover, the second moving mechanism 34 of the first conveying device 30 moves the holding portion 33 and the cylindrical member 7 in the vertical direction between the first forming drum 21 and the second forming drum 22 and moves them from the third position P3 to the fourth position P4. As a result, the cylindrical member 7 is conveyed to the delivery position (fourth position P4) to the third forming drum 23. Therefore, the second moving mechanism 34 is a conveying mechanism for conveying the cylindrical member 7 to the delivery position by moving it between the first forming drum 21 and the second forming drum 22.

When the cylindrical member 7 is conveyed, the first conveying device 30 (holding portion 33) holds the cylindrical member 7 while maintaining the cylindrical shape and arranges it at the delivery position (the combination position with the side member 5). Subsequently, the moving device 27 moves the third forming drum 23 from the outside position S1 of the cylindrical member 7 at the delivery position to the inside position S2 (fourth position P4) and inserts it into the cylindrical member 7. As a result, the third forming drum 23 and the pair of cylindrical side members 5 are arranged inside the holding portion 33 and the cylindrical member 7. Moreover, the cylindrical member 7 is arranged around the pair of cylindrical side members 5, and the pair of cylindrical side members 5 are arranged at the combination position with the cylindrical member 7. Subsequently, by expanding the third forming drum 23, the pair of side members 5 are brought into close contact with the cylindrical member 7, and the side members 5 and the cylindrical member 7 are integrated. As described above, the third forming drum 23 combines the cylindrical side members 5 with the cylindrical member 7 so as to form the cylindrical carcass band 8.

After that, holding of the cylindrical member 7 by the holding portion 33 is released, and the third forming drum 23 is moved from the inside position S2 to the outside position S1. The holding portion 33 is moved by the first conveying device 30 from the fourth position P4 to the third position P3. Subsequently, the second conveying device 40 conveys the pair of bead members 6 to the third forming drum 23 and combines it with the carcass band 8. In that state, the third forming drum 23 is contracted, and the bead member 6 and the carcass band 8 are removed from the third forming drum 23. The bead member 6 and the carcass band 8 are held by the second conveying device 40 and conveyed from the third forming drum 23 to the subsequent process. The aforementioned processes are repeated by the forming device 1, and the carcass band 8 is continuously formed.

As described above, in this embodiment, the first to third forming drums 21 to 23 are not turned, but the third forming drum 23 is arranged below the arrangement space (first arrangement space R1) of the first and second forming drums 21 and 22, and a formed member is conveyed among the first to third forming drums 21 to 23. As a result, by effectively utilizing the space, the space (installation space for the forming device 1) required for forming of the carcass band 8 can be reduced. The area occupied by the forming device 1 can be also reduced. Moreover, a waste of time involved with turning of the first to third forming drums 21 to 23 is prevented, and the forming interval by the first to third forming drums 21 to 23 can be reduced. Therefore, by reducing the forming time of the carcass band 8, productivity of forming of the carcass band 8 can be improved. The functions of the first to third forming drums 21 to 23 can be specified in accordance with the respective forming objects. With that, the forming works of the first to third forming drums 21 to 23 are simplified, and automation of the forming of the carcass band 8 can be realized easily.

When the cylindrical carcass ply 3 and the cylindrical member 7 are conveyed, the carcass ply 3 and the cylindrical member 7 are held while maintaining the cylindrical shapes. As a result, the combination of the carcass ply 3 and the inner liner 4 and the combination of the cylindrical member 7 and the side member 5 can be made accurately and easily. The cylindrical carcass ply 3 is conveyed from the first forming drum 21 to the second forming drum 22, while locating the axes of the first forming drum 21 and the second forming drum 22 on the same line. At that time, it is only necessary that the cylindrical carcass ply 3 is conveyed linearly in the axial direction of the first and second forming drums 22. Therefore, the carcass ply 3 can be conveyed easily, and the carcass ply 3 and the inner liner 4 can be combined accurately.

When the cylindrical member 7 is conveyed to the delivery position to the third forming drum 23, the cylindrical member 7 is moved between the first forming drum 21 and the second forming drum 22. With that, the occupied area of the forming device 1 including the conveying path of the cylindrical member 7 can be drastically reduced. Moreover, the conveying path of the carcass ply 3 and the cylindrical member 7 by the first conveying device 30 is simplified, and the holding portion 33 can be moved in a short time. By moving the third forming drum 23 to the outside position S1 and the inside position S2 of the cylindrical member 7 at the delivery position, the conveyance of the cylindrical member 7 by the first conveying device 30 and movement of the third forming drum 23 can be performed smoothly. When the axis of the third forming drum 23 and the center line of the holding portion 33 (cylindrical member 7) are located on the same line, it is only necessary to move the third forming drum 23 linearly. As a result, the third forming drum 23 can be moved easily, and the side member 5 and the cylindrical member 7 can be combined accurately.

Note that, when the cylindrical carcass ply 3 is to be formed, in a state in which other tire constituent members are integrally formed with the carcass ply 3, the carcass ply 3 may be formed by the first forming drum 21. Similarly, when the cylindrical inner liner 4 is to be formed, in a state in which the other tire constituent members are integrally formed with the inner liner 4, the inner liner 4 may be formed by the second forming drum 22. When the cylindrical side member 5 is to be formed, in a state in which the other tire constituent members are integrally formed with the side member 5, the side member 5 may be formed by the third forming drum 23.

The third forming drum 23 may be arranged below the second forming drum 22. In this case, the layout of the forming device 1 is changed in accordance with the positions of the first to third forming drums 21 to 23.

REFERENCE SIGNS LIST 1 forming device
2 frame
3 carcass ply
4 inner liner
5 side member
6 bead member
7 cylindrical member
8 carcass band
9 guide rail
10 guide rail
11 first supply device
12 second supply device
13 third supply device
14 fourth supply device
21 first forming drum
22 second forming drum
23 third forming drum
24 to 26 driving device
27 moving device
30 first conveying device
31 guide rail
32 first moving mechanism
33 holding portion
34 second moving mechanism
35 holding means
40 second conveying device
41 moving mechanism
42 holding portion
R1 first arrangement space
R2 second arrangement space

The invention claimed is:

1. A carcass band forming method for forming a cylindrical carcass band by combining a carcass ply, an inner liner, and side members, comprising the steps of:

forming a cylindrical carcass ply by a first forming drum;

forming a cylindrical inner liner by a second forming drum;

forming a cylindrical side member by a third forming drum arranged below an arrangement space for the first forming drum and the second forming drum;

conveying horizontally the cylindrical carcass ply from the first forming drum to the second forming drum by a first moving mechanism;

forming a cylindrical member by combining the cylindrical inner liner with the cylindrical carcass ply by the second forming drum;

conveying horizontally the cylindrical member from the second forming drum to a position between the first forming drum and the second forming drum by the first moving mechanism and conveying vertically the same to a position to be delivered to the third forming drum by a second moving mechanism mounted on a moving portion of the first moving mechanism;

moving the third forming drum from an outside position to an inside position of the cylindrical member being at the position to be delivered; and forming a carcass band by combining the cylindrical side member with the cylindrical member by the third forming drum.

2. The carcass band forming method according to claim 1, wherein the step of conveying the cylindrical carcass ply has a step of holding the cylindrical carcass ply while maintaining the cylindrical shape; and the step of conveying the cylindrical member has a step of holding the cylindrical member while maintaining the cylindrical shape.

3. The carcass band forming method according to claim 1, wherein the step of conveying the cylindrical carcass ply includes a step of conveying the cylindrical carcass ply from the first forming drum to the second forming drum while locating axes of the first forming drum and the second forming drum on a same line.

* * * * *